United States Patent [19]

El Sayed et al.

[11] Patent Number: 5,389,712
[45] Date of Patent: Feb. 14, 1995

[54] DIFFICULTLY FLAMMABLE POLYAMIDE MOULDING MATERIALS

[75] Inventors: Aziz El Sayed, Leverkusen; Edgar Ostlinning, Düsseldorf; Karsten-Josef Idel, Krefeld; Dieter Freitag, Krefeld; Georg Heger, Krefeld, all of Germany

[73] Assignee: Bayer AG, Leverkusen, Germany

[21] Appl. No.: 171,115

[22] Filed: Dec. 21, 1993

[30] Foreign Application Priority Data

Jan. 7, 1993 [DE] Germany ............................ 4300260

[51] Int. Cl.⁶ .......................... C08K 3/20; C08K 3/40; C08L 77/00
[52] U.S. Cl. .................................... 524/424; 524/425; 524/442; 524/494; 524/495; 524/514; 524/540; 524/606; 524/607; 523/200
[58] Field of Search ............... 524/424, 425, 494, 495, 524/514, 540, 607, 606; 528/324; 523/200

[56] References Cited

U.S. PATENT DOCUMENTS

| | | | |
|---|---|---|---|
| 4,877,823 | 10/1989 | Plachetta et al. | 524/507 |
| 5,021,484 | 6/1991 | Schreiber et al. | 524/425 |
| 5,081,222 | 1/1992 | Reimann et al. | 528/324 |
| 5,244,941 | 9/1993 | Bruckbauer et al. | 523/513 |

FOREIGN PATENT DOCUMENTS

| | | |
|---|---|---|
| 3136058 | 5/1977 | Japan . |
| 7106797 | 12/1980 | Japan . |
| 8075707 | 10/1981 | Japan . |

*Primary Examiner*—Tae H. Yoon
*Attorney, Agent, or Firm*—Connolly and Hutz

[57] ABSTRACT

The present invention relates to easily processable polyamide moulding materials with very good mechanical and electrical properties based on calcium magnesium carbonate hydrate as the flame-retardant additive.

15 Claims, No Drawings

DIFFICULTLY FLAMMABLE POLYAMIDE MOULDING MATERIALS

This invention relates to an easily processable polyamide material with very good mechanical and electrical properties based on calcium magnesium carbonate hydrate as the flame-retardant additive.

Polyamides are high-grade thermoplastics and are characterized in particular by their ease of processing, very good mechanical and electrical properties, good dimensional stability when hot and good chemical resistance.

The properties of these proven polyamides can be significantly enhanced by reinforcement with glass fibres, glass spheres, mineral fillers or mixtures of these. Modification of the elastomer improves the impact toughness of reinforced polyamides. New products tailored specifically for special fields of application are constantly being developed due to the multiplicity of combinations which are possible. The surface quality is noticeably impaired by the addition of mineral fillers or glass fibres to the polyamide, however.

Polyamides have long been proven in the electrical field. Flame-retardant polyamides are mainly used in this area of application.

Known flame-retardants which have long been used in polyamides include red phosphorus, organic halogen compounds, certain nitrogen compounds and magnesium hydroxide.

Thus, according to DE 3 713 746 A1 (=U.S. Pat. No. 4,877,823) and EP-A 299 444 (=U.S. Pat. No. 5,081,222) for example, red phosphorus is mainly use in glass fibre-reinforced PA 66 and 6/6T. Such compounds can only be supplied in dark colours on account of the inherent red colour of the phosphorus and its pigment-like character.

Furthermore, it tends to form phosphine and phosphates under the influence of heat and moisture (by disproportionation of the phosphorus). Phosphine is problematical from a toxicological standpoint and corrodes the copper-containing contacts in electrical installations and appliances (e.g. on printed circuit boards, switches, etc.). Phosphates form conducting coatings between the contacts under some circumstances. The phosphorus disproportionation reaction can be delayed, but not prevented, by means of suitable stabilizers.

Brominated diphenyls or diphenyl ethers are examples of organic halogen compounds which have long been used in combination with antimony trioxide. Since the problems associated with dioxin became known, the following halogen compounds have been used:
- chlorinated cycloaliphatic hydrocarbons (e.g. Dechlorane® Plus manufactured by Occidental Chemical Co.)
- brominated styrene oligomers (see DE-A 2 703 419, for example)
- polystyrenes with a brominated aromatic nucleus (e.g. PYRO-CHECK® 68 manufactured by FERRO Chemicals).

Zinc salts or iron oxides are currently used as a synergist for the above-mentioned halogen compounds. Most halogen-based flame-retardants start to decompose thermally at the usual polyamide processing temperatures. Corrosive gases are evolved during this decomposition. As a consequence, the electrical contacts in switches or electrical installations are destroyed. Moreover, the electrical properties of polyamides are impaired by the ionogenic cleavage products formed during the decomposition.

These disadvantages are accepted for the manufacture of moulded components in light colours.

Amongst the nitrogen compounds used, melamine salts have primarily only been proved useful as flame-retardants for unreinforced polyamides. Products such as these have a light inherent colour and good electrical properties. The relatively low decomposition temperature of melamine salts is a disadvantage.

Magnesium hydroxide is a proven flame-retardant for polyolefines and elastomers. Compared with aluminium hydroxide, which was previously used, it has the advantage of a higher dehydration temperature (340° C.). The use of magnesium hydroxide in polyamides is described in the literature. However, a magnesium hydroxide concentration in the moulding materials greater than 55 weight % is always necessary, in order to achieve the V 0 rating for 1.6 mm flame-retardant testpieces in accordance with UL 94 (U.S. Underwriters Laboratories Fire Test). Processing products such as these is problematical. The mechanical properties of mouldings produced from the above-mentioned materials fall to a lower level. In addition, the surface quality exhibits a marked deterioration. EP 0 335 165A1 proposes the addition of 0.1 to 20 weight % of an olefine homopolymer or copolymer provided with functional groups and 3 to 30 weight % of a reinforcing fibre to polyamide, in order to produce flame-retardant compounds with 40–70 weight % of special types of magnesium hydroxide, which have a specific surface of less than 18 m$^2$/g. However, with normal magnesium hydroxide and without olefinic additives the V 0 rating at 1.6 mm thickness in accordance with UL 94 is not achieved. Compounds such as these cannot be processed easily, due to the coupling of the special olefines with polyamide and the high degree of filling.

Magnesium calcium carbonate hydrate has a higher loss on ignition (54%) than magnesium hydroxide (33%) and splits off water and carbon dioxide at lower temperatures than magnesium hydroxide. The product is therefore only recommended and used for polypropylene/polybutylene terephthalate; PP and PBT. The processing temperature of polyamides is above the decomposition temperature of magnesium calcium carbonate hydrate ($\approx$285° C.).

The object of the present invention is to produce a polyamide moulding material in which magnesium calcium carbonate hydrate can be incorporated without decomposition resulting from shear and without difficulties. It is thus possible to produce polyamide moulding materials which are free from phosphorus and halogens but which are easily processed, without the above-mentioned disadvantages of the prior art, and with a V 0 rating at 1.2 mm in accordance with UL 94.

It has been found that the said properties can be obtained by a combination of
- 5–50 weight % of a thermoplastic, partially crystalline polyamide,
- 2–30 weight % of a thermoplastic additive which reduces the processing temperature,
- 0–35 weight % of reinforcing materials,
- 45–60 weight % of magnesium calcium carbonate hydrate, and
- 0–2.0 weight % of additives such as internal lubricants, stabilizers and nucleating agents.

The present invention relates to difficultly flammable polyamide moulding materials comprising A) from 5 to 50 weight %, preferably from 10 to 43 weight %, of a thermoplastic polyamide, B) from 2 to 30 weight % of a thermoplastic additive which reduces the processing temperature of the polyamide, C) from 40 to 60 weight %, preferably 45 to 60 weight %, of magnesium calcium carbonate hydrate, D) from 0 to 35 weight %, preferably from 0 to 25 weight %, of reinforcing materials, and E) from 0 to 2.0 weight % of processing additives.

The present invention also relates to the use of the polyamide moulding materials for the manufacture of mouldings from the moulding materials according to the invention, and to mouldings manufactured from the moulding materials according to the invention.

The materials according to the invention are produced in one extrusion operation or in two extrusion operations using a commercially available single-shaft or double-shaft extruder or kneader. The metered addition of the magnesium calcium carbonate hydrate to the polyamide melt is effected in the granular material funnel and/or by means of a side worm. The reinforcing materials (e.g. glass fibres) are added in the glass fibre aperture just in front of the nozzle, as in the prior art. The temperature of the material depends upon the polyamides used and is about 20° C. lower than the usual processing temperatures (290° and 310° C.).

Suitable polyamides for the moulding materials according to the invention comprise partially crystalline polyamides. PA 6, PA 66, PA 46, PA 610, PA 6/6T and partially crystalline copolyamides based on these components are particularly preferred.

Suitable additives B) which reduce the processing temperature of the polyamide in the moulding materials according to the invention preferably comprise a) 5 to 29 weight %, more preferably 8 to 25 weight % of copolyamides produced from isophthalic acid and/or terephthalic acid and hexamethylene diamine/caprolactam and/or b) 1 to 9 weight %, preferably 2 to 6 weight %, of polyhydroxy compounds of the Novolak type with a degree of polymerization from 3 to 20, as described in EP-A-423 564. Moreover, the sum of a)+b) should not exceed 30 weight %. Therefore, the sum of a)+b) (when both are present) is from 6 to 30 % by weight of the final moulding material.

Commercially available glass fibres and/or carbon fibres and/or mineral fibres which are surface-treated for polyamides, preferably glass fibres, may be used as the reinforcing materials D) for the moulding materials according to the invention, for example.

The commercially available natural mineral, with or without surface treatment, is used as the magnesium calcium carbonate hydrate according to this invention. The bonding of the magnesium calcium carbonate hydrate to polyamide is significantly improved by treating the surface of the mineral with bonding agents (e.g. aminosilanes, epoxysilanes, salts of fatty acids). Suitable commercially available products which can be used according to this invention comprise, for example, Martinett ® manufactured by Martinswerk, Securoc ® manufactured by Incemin, and Ultracarb ® manufactured by Microfine. Finely divided magnesium calcium carbonate hydrate with an average particle diameter of 0.4–10 µm (numerical average) is preferred.

Processing additives E) comprise commercially available internal lubricants, heat stabilizers and/or nucleating agents.

The following products were used in the examples below:

Polyamide 6 PA 6=Durethan ® B 31 F manufactured by Bayer AG (relative viscosity $(\eta_{rel.})=3$ [measured in 1% metacresol solution at 25° C.]).

Partially aromatic copolyamide=Durethan ® VP KU 2-2160 copolyamide comprising 85 parts by weight of PA 6 and 15 parts by weight of PA produced from isophthalic acid and hexamethylene diamine.

Vulkadur ® RB=Novolak phenol formaldehyde resin manufactured by Bayer AG: melting point 85° C., 1.2 g/cm$^3$.

Magnesium calcium carbonate hydrate=Securoc C 10 manufactured by Incemin; loss on ignition at 1100° C. 54%, density 2.6 g/cm$^3$, particle size distribution as measured by SEDIGRAPH 5000 d: d$_{50}$ 0.5 to 0.6 µm.

Glass fibre=Bayerglas CS 7919; diameter 11 µm; length 4.5 min.

Amide wax=Abrilwax; stearoyl/palmitoyl ethylenediamine.

EXAMPLES 1 to 4

The materials used as listed in Table 1 were premixed, extruded in a double-shaft extruder and then granulated. The granular material obtained was dried at 70° C. for 4 hours in a vacuum drying oven and then injection-moulded at 270°–280° C. to form testpieces on an Arburg injection-moulding machine. The mechanical and electrical properties and the combustion behaviour of the testpieces obtained were determined in accordance with UL 94 (Underwriter Laboratories USA). The results are reproduced in Table 1. It may be seen that, in addition to a slight improvement in mechanical characteristics, the mixtures according to the invention (Examples 2 to 4) exhibit a significantly higher surface quality and a better flame-retardant effect than those of the known mixtures.

TABLE 1

| | | Test | | | | |
|---|---|---|---|---|---|---|
| | | 1 | 2 | 3 | 4 | |
| | | Comparative test | | | | |
| | | Composition | | | | |
| Polyamide 6 | (wt. %) | 40.2 | 17.0 | 16.9 | 36.2 | |
| Partially aromatic copolyamide | (wt. %) | 0.0 | 23.2 | 22.9 | 0.0 | |
| Vulkadur RB | (wt. %) | 0.0 | 0.0 | 0.0 | 4.0 | |
| Mg Ca carbonate hydrate | (wt. %) | 51.7 | 51.7 | 45.1 | 51.7 | |
| Glass fibres | (wt. %) | 8.0 | 8.0 | 15.0 | 8.0 | |
| Amide wax | (wt. %) | 0.1 | 0.1 | 0.1 | 0.1 | |
| | Processing conditions and technical data | | | | | |
| Extrusion temp. | (°C.) | 290 | 260 | 270 | 260 | |
| Izod impact | (kJ/m$^2$) | 25 | 29 | 33 | 28 | ISO1801C |

TABLE 1-continued

| | | Test | | | | |
|---|---|---|---|---|---|---|
| | | 1 | 2 | 3 | 4 | |
| | | | | | Comparative test | |
| toughness | | | | | | |
| Surface quality | | − − | + + + | + + + | + + | |
| Bending strength | (MPa) | 190 | 198 | 211 | 201 | DIN 53452 |
| Edge fibre flow | (%) | 2.0 | 2.1 | 2.0 | 2.0 | DIN 53452 |
| Bending E modulus | (MPa) | 12000 | 11000 | 13000 | 12000 | DIN 53457-B3 |
| Hot wire test temp. (1 mm) | (°C.) | 960 | 960 | 960 | 960 | IEC 695-2-1 |
| Fire protection class at | 3.2 mm | V 0 | V 0 | V 0 | V 0 | UL 94 |
| | 1.6 mm | V 2 | V 0 | V 0 | V 0 | UL 94 |
| | 0.8 MM | V 2 | V 0 | V 0 | V 0 | UL 94 |

Surface quality assessment:
− − unsatisfactory (blemished, rough)
− defective
+ satisfactory
+ + good
+ + + outstanding (smooth, glossy, no blemishes)

We claim:

1. Difficultly flammable polyamide moulding materials consisting of:
   A) from 5 to 50 weight % of a thermoplastic, partially crystalline polyamide selected from the group consisting of PA 6, PA 66, PA 46, PA 610, PA 6/6T, partially crystalline copolyamides formed from these components or admixtures of these substances,
   B) from 8 to 25 weight % of a thermoplastic additive consisting of a copolyamide formed from isophthalic acid and/or terephthalic acid and hexamethylenediamine/caprolactam which reduces the processing temperature of the polyamide,
   C) from 0 to 35 weight % of reinforcing materials,
   D) from 45 to 60 weight % of magnesium calcium carbonate hydrate, and
   E) from 0 to 2.0 weight % of additives selected from the group consisting of internal lubricants, stabilizers and nucleating agents.

2. Difficultly flammable polyamide moulding materials consisting of:
   A) from 5 to 50 weight % of a thermoplastic, partially crystalline polyamide selected from the group consisting of PA 6, PA 66, PA 46, PA 610, PA 6/6T, partially crystalline copolyamides formed from these components or admixtures of these substances,
   B) from 1 to 9 weight % of polyhydroxy Novolak compounds with a degree of polymerization from 3 to 20,
   C) from 0 to 35 weight % of reinforcing materials,
   D) from 45 to 60 weight % of magnesium calcium carbonate hydrate, and
   E) from 0 to 2.0 weight % of additives selected from the group consisting of internal lubricants, stabilizers and nucleating agents.

3. Moulding materials according to claim 1, characterized in that PA 6, PA 66, PA 46, PA 610 or PA 6/6T are used on their own or in admixture as the thermoplastic polyamide A).

4. Moulding materials according to claim 1, characterized in that glass fibres, carbon fibres, mineral fibres or mixtures thereof are used as the reinforcing materials D).

5. Moulding materials according to claim 1, characterized in that magnesium calcium carbonate hydrate with a surface treatment which improves the bonding, and which has an average particle diameter of 0.4 to 10 µm, is used as the flame-retardant additive.

6. A method of using the moulding materials according to claim 1, wherein the materials are manufactured into moulded parts.

7. Mouldings manufactured from the moulding materials according to claim 1.

8. Moulding materials according to claim 2, characterized in that glass fibres, carbon fibres, mineral fibres or mixtures thereof are used as the reinforcing materials D).

9. Moulding materials according to claim 3, characterized in that glass fibres, carbon fibres, mineral fibres or mixtures thereof are used as the reinforcing materials D).

10. Moulding materials according to claim 2, characterized in that magnesium calcium carbonate hydrate with a surface treatment which improves the bonding, and which has an average particle diameter of 0.4 to 10 µm, is used as the flame-retardant additive.

11. Moulding materials according to claim 3, characterized in that magnesium calcium carbonate hydrate with a surface treatment which improves the bonding, and which has an average particle diameter of 0.4 to 10 µm, is used as the flame-retardant additive.

12. Moulding materials according to claim 4, characterized in that magnesium calcium carbonate hydrate with a surface treatment which improves the bonding, and which has an average particle diameter of 0.4 to 10 µm, is used as the flame-retardant additive.

13. A method of using the moulding materials according to claim 2, wherein the materials are manufactured into moulded parts.

14. Mouldings manufactured from the moulding materials according to claim 2.

15. Difficultly flammable polyamide moulding materials consisting of:
   A) from 5 to 50 weight % of a thermoplastic, partially crystalline polyamide selected from the group consisting of PA 6, PA 66, PA 46, PA 610, PA 6/6T, partially crystalline copolyamides formed from these components or admixtures of these substances,
   B1) from 5 to 29 weight % of a thermoplastic additive consisting of a copolyamide formed from isophthalic acid and/or terephthalic acid and hexamethylenediamine/caprolactam which reduces the processing temperature of the polyamide, B2) from 1 to 9 weight % of polyhydroxy Novolak compounds with a degree of polymerization from 3 to 20 which reduce the processing temperature of the polyamide, C) from 0 to 35 weight % of reinforcing materials, D) from 45 to 60 weight % of magnesium calcium carbonate hydrate, and E) from 0 to 2.0 weight % of additives selected from the group consisting of internal lubricants, stabilizers and nucleating agents, wherein the sum of B1+B2 is from 6 to 30 weight % of the final moulding material.

* * * * *